June 23, 1959 W. A. GASKILL 2,892,060

FUSIBLE DEVICE

Filed Aug. 12, 1955 4 Sheets-Sheet 1

FUSIBLE DEVICE

Filed Aug. 12, 1955

June 23, 1959 W. A. GASKILL 2,892,060

FUSIBLE DEVICE

Filed Aug. 12, 1955 4 Sheets-Sheet 3

June 23, 1959 W. A. GASKILL 2,892,060

FUSIBLE DEVICE

Filed Aug. 12, 1955 4 Sheets-Sheet 4

United States Patent Office 2,892,060

Patented June 23, 1959

2,892,060

FUSIBLE DEVICE

William A. Gaskill, Turtle Creek, Pa., assignor to Westinghouse Electric Corporation, East Pittsburgh, Pa., a corporation of Pennsylvania Application August 12, 1955, Serial No. 527,977

10 Claims. (Cl. 200—113)

This invention relates to fusible devices in general, and, more particularly, to improved mounting constructions therefor and improved interruption thereof. Certain features of the invention are described and claimed in a divisional patent application filed March 18, 1958, Serial Number 722,221, entitled "Fusible Device" and assigned to the assignee of the instant application.

A general object of my invention is to provide an improved fusible device which will render a more effective and improved operation than has been obtained heretofore.

A more specific object of my invention is to provide an improved mounting construction for a fuse device which will carry heavy currents therethrough without heating and which will provide improved contact engaging surfaces.

Another object is to provide a simplified mounting construction for a double-barreled type of fusible device.

Still another object is to provide an improved interrupting construction for a fusible device, particularly one of the current-limiting type.

Still a further object of my invention is to provide an improved fusible device particularly adapted for momentary currents of appreciable value, such as that encountered in motor-starting duty, in which suitable heat-absorbing means is provided adjacent the fusible elements to prevent blowing of the fusible device on such momentary overload currents of short duration.

In United States Patent 2,605,371, issued July 29, 1952 to Harold H. Fahnoe, and assigned to the assignee of the instant application, there is disclosed a fusible device particularly adapted for starting motors, or for withstanding for short times moderate overloads, in which a plurality of heat wells is provided along the axial length of the fuse. These heat wells, or heat-absorbing sections, assist in preventing the blowing of the fusible device by absorbing a considerable portion of the heat developed in the fuse wires during temporary overloads of short duration, such as during motor-starting duty.

It is a further object of my invention to improve the fuse construction of the type set out in the aforesaid patent, so as to particularly adapt such a construction to the effective interruption of moderate overload currents of long duration.

Still another object of my invention is to provide an improved interrupting structure for a fusible device in which one or more insulating discs not only have a pocketed construction to contain heat-absorbing slugs, but also such one or more discs having holes or perforations disposed circumferentially about the outer periphery of the insulating discs to assist in supporting a plurality of electrically parallel fusible elements.

Further objects and advantages will readily become apparent upon reading the folowing specification, taken in conjunction with the drawings, in which.

Figure 1:
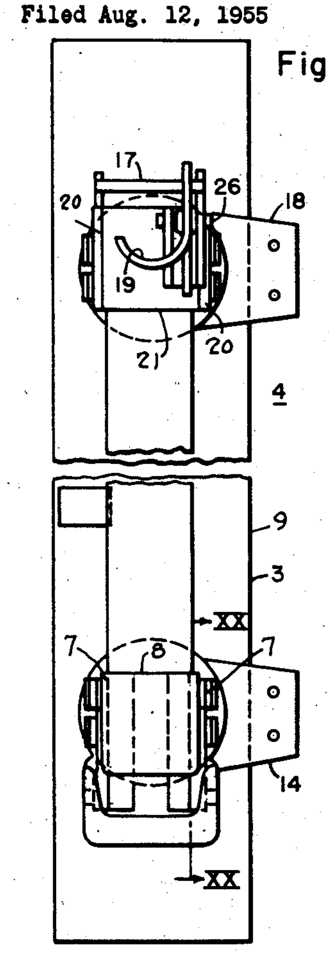
Figure 1 is a front elevational view of a fusible device incorporating the features of my invention, and shown in the closed, operative position.
Figures 2, 20:
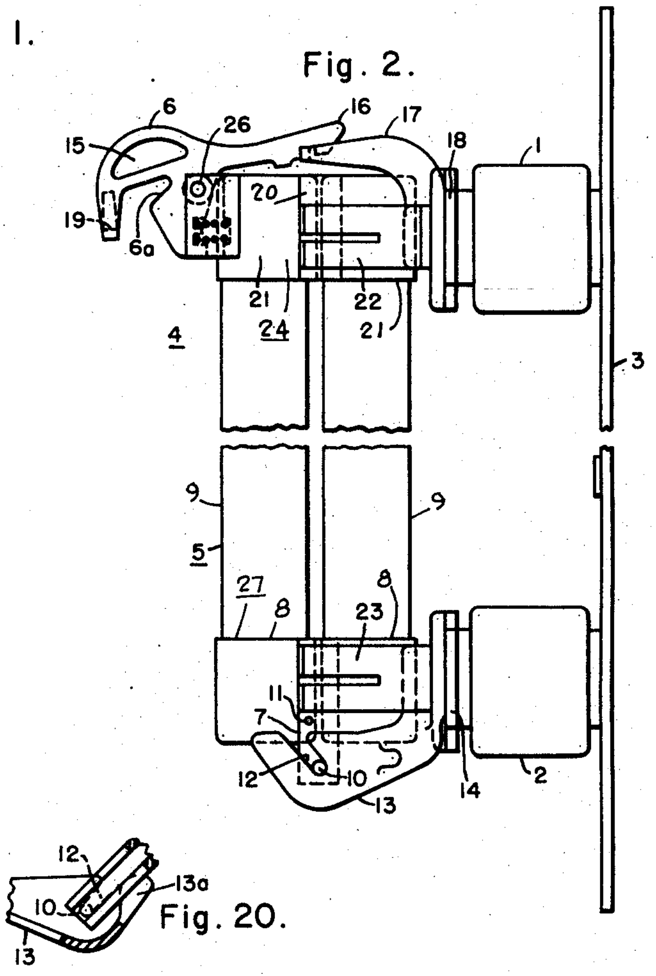
Fig. 2 is a side elevational view of the fusible device shown in Fig. 1, also indicated in the closed, operative position.
Fig. 20 is a fragmentary, sectional view taken along the line XX—XX of Fig. 1.

Referring to the drawings, and more particularly to Figs. 1 and 2 thereof, it will be observed that a pair of insulators 1, 2, mounted upon a panel 3, support a double-barreled fusible device or assembly, generally designated by the reference numeral 4, and adapted for pivotal rotation.

Figure 3:
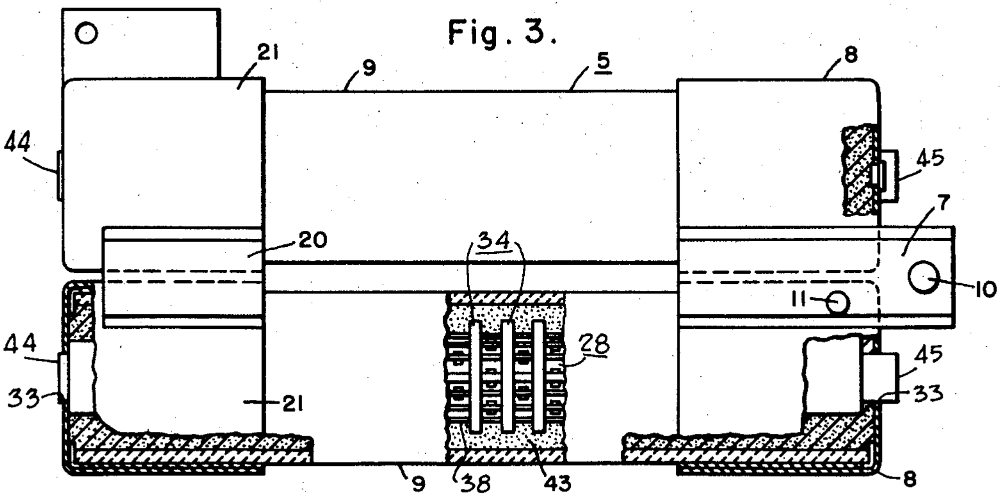
Fig. 3 is a side elevational view of the double-barreled fuse holder, partially broken away in vertical section to disclose internal features of the fuse.

The double-barreled fuse holder 5 is shown in Fig. 3 in a partially assembled state, a hook-stick operated latch 6 being omitted in the view of Fig. 3. It will be observed that a contact bridging member 7 is brazed to each of the ferrules 8 disposed at the lower end of the fuse tubes 9 and has a trunnion pin 10 and a guide pin 11 rigidly affixed thereto.

As more clearly shown in Fig. 2 of the drawings, the trunnion pins 10 associated with the two contact bridging members 7 are disposed within slots 12 associated with a hinge member 13 of generally bifurcated construction, which is associated with the lower terminal 14 of the device. As is obvious, by placing the prong of a hook-stitch within an eye 15 of the latch 6, one may raise the nose 16 of the latch 6 and unlatch the same from a latching member 17 associated with the upper terminal 18 of the fusible device 4, to effect thereby rotative counterclockwise motion of the double-barreled fuse holder 5 about the trunnion pins 10 as a center. This will permit opening of the connected circuit, as well known.

Such opening rotative motion may continue until the contact bridging members 7 engage stop shoulders 13*a* integrally formed with the hinge member 13, as shown in Fig. 20. It will, of course, be apparent that one may also employ the hook-stick to effect removal of the fuse holder 5 completely out of the hinge member 13 by placing the hook-stick within a cradle portion 19 of the latch member 6 with the prong of the switch stick in the slot 6*a* in a manner more clearly brought out in U.S. Patent 2,024,744, issued December 17, 1935, to Herbert L. Rawlins, and also assigned to the assignee of the instant application. Since this feature is not a part of the present invention, a further description thereof appears unnecessary, and reference may be had to the aforesaid Patent 2,024,744 for details of such a disassembly operation.

A contact and bridging member 20 is associated with each side of the ferrules 21 disposed at the upper end of the fuse holder 5, preferably being brazed thereto. It will be observed, with particular reference to Figs. 1 and 2, that fuse clip fingers 22, 23, associated respectively with the upper terminal 18 and the lower terminal 14, bear laterally against the faces of the contact bridging members 7, 20. Thus, the bridging members 7, 20 not only serve to effect rigid positioning of the fuse tubes 9 with respect to each other, but also the bridging members 7, 20 electrically connect the two fuse tubes 9 in electrical parallel, and moreover serve as the contact bearing portion with the fuse clip fingers 22, 23. In addition, the lateral edges of the contact bridging members 7 engage the stop shoulders 13*a* as shown in Fig. 20. There is thus provided a considerable simplification in the disclosed mounting construction, involving relatively few parts with the contact engagement being maintained by the flexibility which is inherent in the fuse clips 22, 23.

Figure 4:
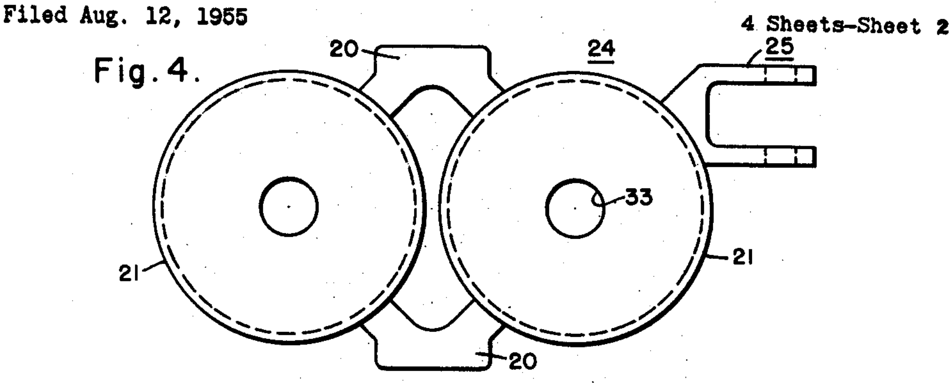
Fig. 4 is a top plan view of the upper or top ferrule assembly for the fusible device of Fig. 3.
Figure 5:
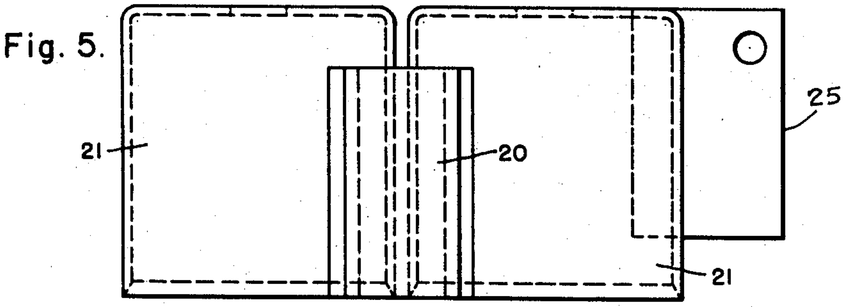
Fig. 5 is a side elevational view of the top ferrule assembly shown in Fig. 4.

Figs. 4 and 5 collectively show in detail the upper ferrule assembly 24 and the manner in which the contact bridging portions 20 are secured to the ferrules 21. A clevis 25 is affixed to the outermost ferrule 21, as shown, to which is pivotally mounted the latch 6 by means of a pivot pin 26.

Figure 6:
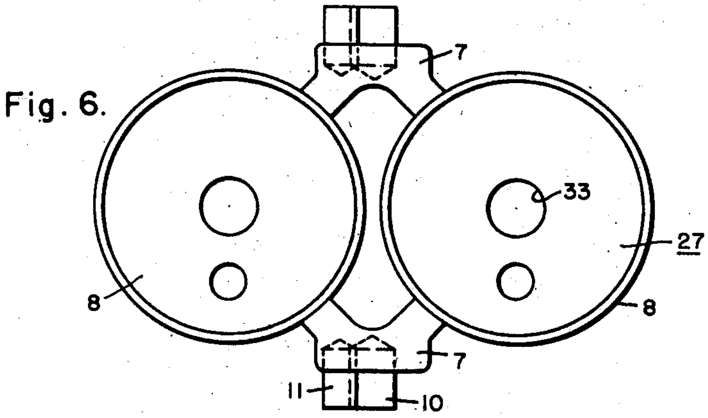
Fig. 6 is an inverted plan view of the lower ferrule assembly of the fusible device shown in Fig. 3.
Figure 7:
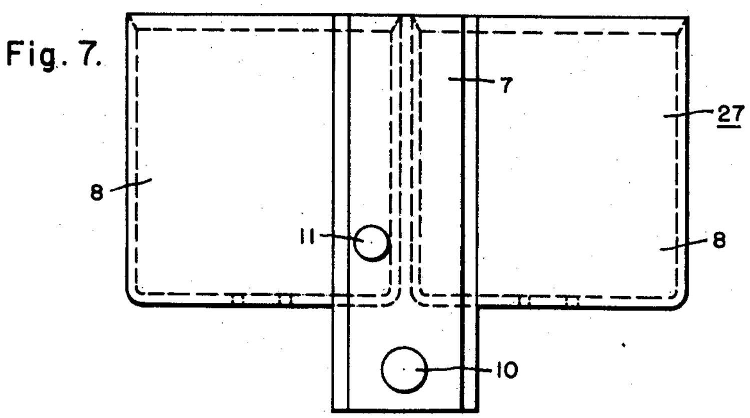
Fig. 7 is a side elevational view of the lower ferrule assembly.

Figs. 6 and 7 collectively show more clearly in detail the lower ferrule assembly 27 comprising the ferrules 8 and the two bridging members 7, which support the trunnion pins 10 and the guide pins 11, the latter moving under the terminal fuse clips 23 during the closing operation to prevent the operator from lifting the fuse holder 5 upwardly. This mounting construction is strong and rigidly supports the ferrules 8, 21 in fixed position, with the contact bridging members 7, 20 protruding laterally sufficiently to provide contact surfaces engaging the fuse clip fingers 22, 23 and with the contact bridging members 7 engaging the stop shoulders 13*a* in the open-circuit position.

The ferrule assemblies 24, 27 are secured to the fuse tubes 9, which are preferably formed from Pyrex glass tubing, by an epoxy resin with an inert filler. This avoids the use of any fuse fittings or mounting clamps, which would not be suitable in the case of using glass tubing for the fuse tubes 9.

The interrupter assembly 28, more clearly shown in Figs. 3 and 8 of the drawings, will now be described. As shown more clearly in Fig. 8, an inner ceramic insulating support rod 29 is employed, a detail side elevational view of which is more clearly shown in Fig. 16 of the drawings. It is preferable to have the support rod 29 of a non-gas-evolving material, as are certain other parts of the interrupter 28, as more fully described hereinafter, so that no appreciable gas pressure will be developed within the glass fuse tubes 9, particularly since the fuse is completely sealed. This adapts the fuse device for application in an explosive or corrosive atmosphere. It will be obvious, of course, that should the application of the fusible device 4 not involve explosive or corrosive atmospheres, the support rod 29 and other parts of the interrupter assembly 28 may be made from other insulating materials other than ceramic, and even gas-evolving materials, without deleterious effects. For purposes of illustration, the invention is disclosed as completely sealed and is suitable for explosive or corrosive atmospheres. In a sealed fusible device it is not desirable to develop any gas pressure whatsoever within the fuse tubes 9. If gas pressure is generated, it would necessitate venting the fuse.

Figures 14, 15, 16, 17, 18, 19:
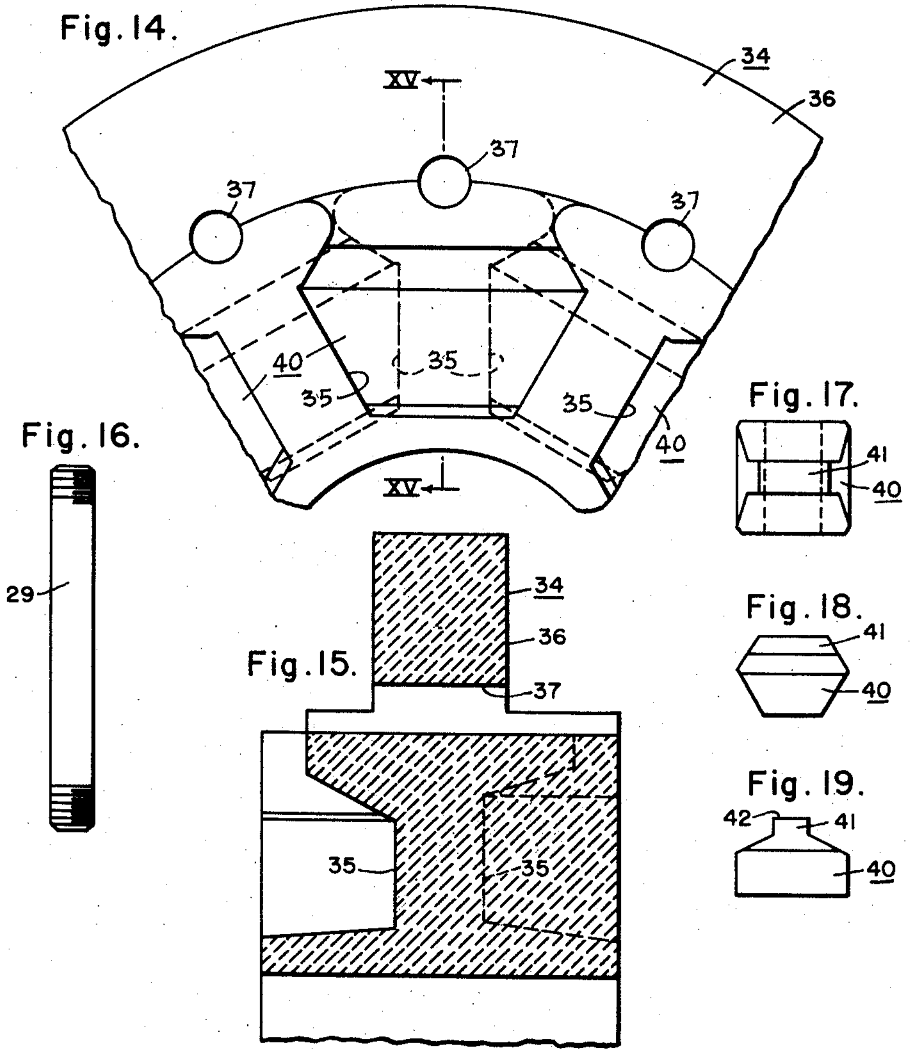
Fig. 14 is a considerably enlarged, fragmentary view of an insulating disc showing the pocketed construction on opposite faces of the disc.
Fig. 15 is a fragmentary sectional view taken substantially along the line XV—XV of Fig. 14.
Fig. 16 is a side elevational view of one of the ceramic insulating support rods utilized in the interrupter.
Fig. 17 is a considerably enlarged top plan view of one of the heat-absorbing slugs utilized in my invention.
Fig. 18 is a side elevational view of the slug shown in Fig. 17.
Fig. 19 is an end elevational view of the slug shown in Fig. 17.

As shown in Fig. 16, the ends of the support rod 29 are threaded and fixedly secure in place a pair of metallic rod end caps 31, 32, which extend through holes 33 (Figs. 4 and 6) in the ferrules 8, 21 and are soldered or brazed thereto. The rod end caps 31, 32 serve to clamp into position a plurality of contiguously disposed insulating ceramic discs 34, also preferably formed of a non-gas-evolving material, for the same reason as set out above. Should, however, the fusible device be used in an atmosphere in which venting was permissible, naturally the insulating discs 34 could be made from any suitable insulating material, even a gas-evolving material. However, as mentioned, for an explosive or corrosive atmosphere, where venting of the fusible device 4 is not desirable, the discs 34 and the support tube 29 are both made of a non-gas-evolving ceramic material.

Figure 13:
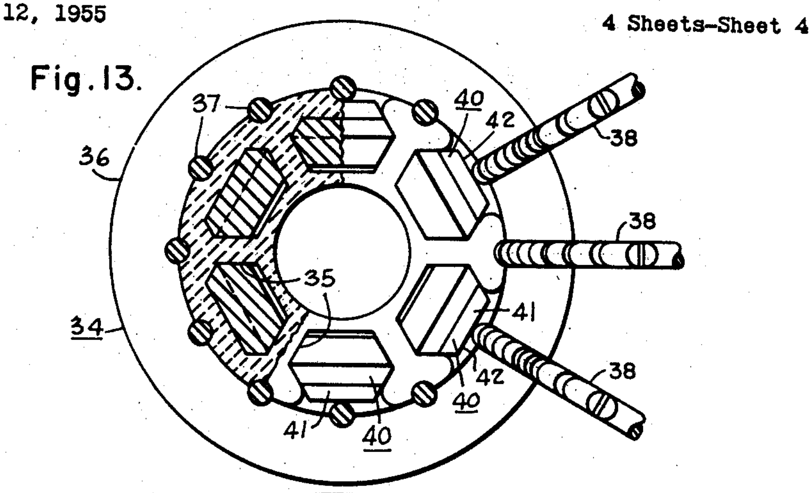
Fig. 13 is an enlarged view of one of the insulating discs employed in the interrupter having assembled thereon a plurality of the heat-absorbing slugs, and also showing the fusible wires associated therewith, a part of the view being broken away in section to more clearly bring out the pocketed construction.

With particular reference to Figs. 13–15 of the drawings, it will be observed that the insulating discs 34 have recesses or pockets 35 formed therein upon opposite faces thereof (Fig. 15). Also, the insulating discs 34 have a web portion 36 with a plurality of circumferentially spaced holes 37 therethrough.

Figure 8:
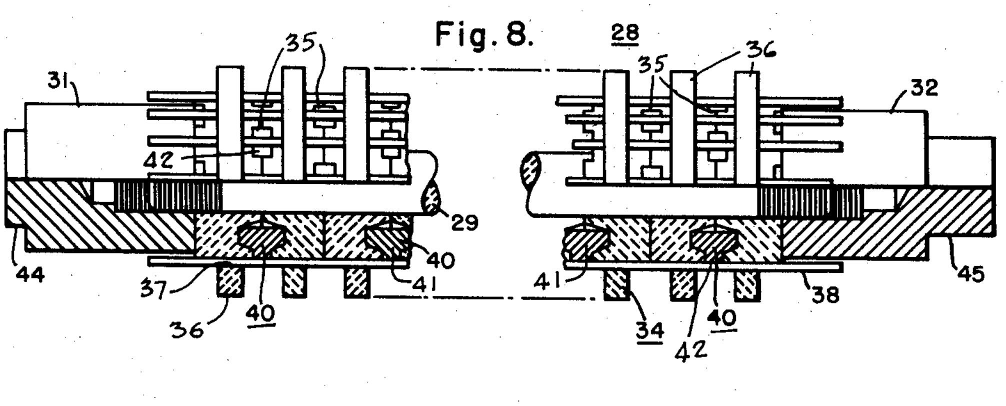
Fig. 8 is a fragmentary, side elevational view of the fuse interrupting structure, partially broken away in vertical section to indicate the internal construction.
Figure 9:
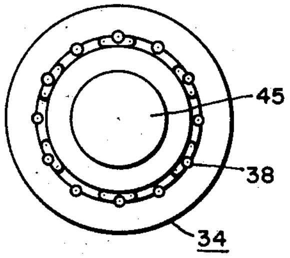
Fig. 9 is an end elevational view of the interrupter shown in Fig. 8.
Figure 10:
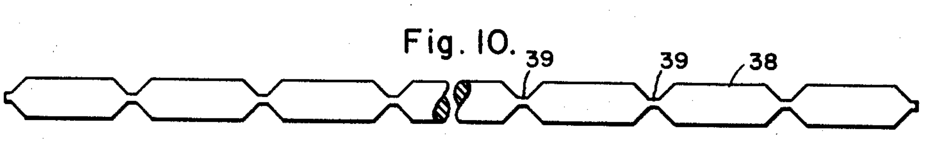
Figs. 10–12 show respectively side, top and end elevational views of one of the fusible elements, or fuse wires, used in my improved invention.
Figure 11:
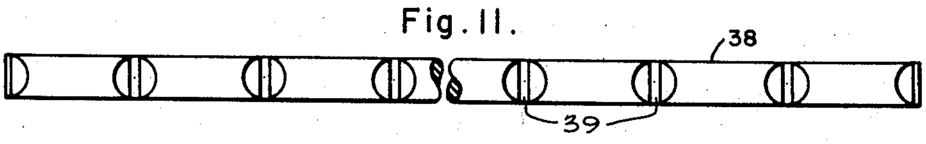
Figure 12:
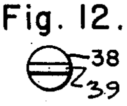

As more clearly shown in Figs. 8 and 13, a plurality of electrically parallel fusible elements, or fuse wires 38, are threaded through the holes 37, which preferably are registered, as indicated in Fig. 8. The configuration of the fuse wires 38 is more clearly apparent from an inspection of Figs. 10–12 of the drawings. It will be observed that the fuse wires 38 have notches, or reduced portions 39 spaced therealong, the purpose for which, and the theory of operation thereof, being adequately set out in the aforesaid U.S. Patent 2,605,371. Further reference to the theory of operation of the fuse wires 38, and the reasons for the provision of the notches 39, will not be disclosed, since it does not constitute a part of the present invention.

Figs. 17–19 show the configuration of the heat-absorbing slugs 40, which are preferably made of a good heat-absorbing material, such as copper. It will be observed, with particular reference to Figs. 17–19 that a ridge 41 is provided, which is disposed immediately adjacent to the fuse wires 38, as shown in Fig. 8 of the drawings. Preferably, the fuse wire 38 is soldered or brazed to the top surface 42 of the ridge 41, so that the mass of the material, forming the slug 40, is disposed away from the fuse wire 38. Thus, only a relatively small surface portion of the slug 40 is disposed immediately below the fuse wire 38, the reason being that during blowing of the fuse wire 38, and the heating up of the slug 40, there is less copper vaporized. By having the great mass of the copper slug 40 disposed internally within the pockets 35 of the discs 34, the emission of copper vapor is minimized.

As more fully disclosed in Fig. 13 of the drawings, each face of the insulating discs 34 has a plurality of, in this particular instance six, copper slugs 40. To effect a closer spacing of the insulating discs 34, it will be observed that the copper slugs 40 are staggered, as indicated in Fig. 8. For other constructions it would, of course, be suitable to uniformly space the slugs 40 along the length of the fuse wires 38, omitting the staggered construction as herein disclosed. For manufacturing reasons, and to effect a closer spacing of the web portions 36, staggered spacing of the copper slugs 40 was resorted to.

An important feature of my invention is the fact that the copper slugs 40 are spaced from each other, and each copper slug 40 is associated with only one fuse wire 38. This is different than the heat-absorbing construction disclosed in the Fahnoe U.S. Patent 2,605,371, wherein the heat wells electrically interconnect all of the fusible elements within a section between a pair of axially spaced heat wells. Although the fusible construction set out in the Fahnoe Patent 2,605,371 gave particularly improved results on motor-starting duty to prevent blowing of the fuse during momentary in-rush currents, it has been discovered that for the interruption of relatively low-value overload currents improved operation may be obtained by having the heat wells spaced from each other, and only one fuse wire associated with each heat well 40. It is believed that one theory of operation, which serves to explain the greatly improved results which are obtained during the interruption of moderate overloads of long duration, is that in effect the blowing of a single fuse element 38 will immediately cause the remainder of the fuse elements 38 to carry the entire overload current; whereas, with the common heat wells, the current is still divided among all of the fusible elements of the other sections. In the fusing of a single fuse wire 38 of the present invention, the entire length of such fuse wire 38 is out of the circuit, and all of the other remaining fuse wires carry the additional current. These will successively fuse and the last one will quickly fuse, of course, giving rise to the desired current-limiting action, as explained in the aforesaid Fahnoe Patent 2,605,371. Thus, by isolating the heat wells 40 from one another, considerably improved and more effective operation is obtained during moderate overload currents of long duration, and there is no chance for any one section to burn out completely and to spark across with relatively low arc voltage.

Preferably quartz sand is disposed internally of the Pyrex glass fuse tubes 9, about the interrupter assemblies 28, to absorb the heat from the fused wires and to assist in interruption. Since all of the elements of the interrupter assembly, which are of insulating material, are ceramic, or non-gas-evolving, no appreciable increase of pressure develops, and there is no need to vent the fuse tube 9. Thus, the application is particularly suitable for explosive or corrosive atmospheres.

The presence of the holes or perforations 37 in the web portions 36 of the insulating discs 34 improves interruption, since at this point the arc is considerably restricted, and a high arc voltage develops, which, in turn, brings about the desired current-limiting action.

From the foregoing description of my invention, it will be apparent that I have provided an improved fusible device, in this particular instance adapted for service at 2,500 and 5,000 volts. The fuse is completely inorganic and was developed specifically for 400 ampere motor-starting service but, of course, is not limited to these current and voltage ratings. A particular advantage of the present construction is that gases are not produced, which, if produced, would require venting of the fuse tube. To make a fuse suitable for corrosive or explosive atmospheres, it is necessary to go to a completely inorganic fuse. The interrupter assembly 28 consists of a central ceramic support rod 29, upon which a number of ceramic pieces or discs 34 are stacked. These pieces have molded pockets into which copper slugs 40 are placed. The ceramic discs 34 have a series of holes in the outer section of the web portion 36, through which the fuse wires 38 pass. The fuse wire 38 is secured to each copper slug or heat well 40 by brazing or soldering. The entire assembly is held in place by copper end connections 31, 32 on the ends of the threaded central support rod 29. All of the fuse wires 38 are brazed or soldered to the copper end connections 31, 32. The entire interrupter assembly 28 is encased in a Pyrex glass tube 9, and the cavity filled with pure quartz sand 43. The end ferrules are secured to the glass by means of an epoxy resin with an inert filler. The interrupter assembly is soldered or brazed to the end ferrules 8, 21 at the point where the reduced end portions 44, 45 pass through the holes 33 in the ferrules 8, 21.

A recapitulation of the operation of the fuse is as follows: While the motor is running normally, the notched-silver fuse wires 38 carry the current from one end of the fuse to the other. During motor starting, the current through each conductor 38 is from 5 to 10 times normal for a period of 5 to 20 seconds, depending on the motor and its application. To prevent the wires 38 from melting during the motor-starting operation, there are periodically spaced along the length of the interrupter assembly 28 heat wells 40 made from copper. These heat wells 40 absorb the heat from the wires 38 during the motor-starting period and dissipate it after the motor has started.

On very high short-circuit currents up to 60,000 amperes, the reduced sections 39 of the fuse wires 38 melt and quickly form a series of arcs, which produce an initially high arc voltage. This high arc voltage (1.5 times normal crest) forces an immediate reduction in the current. This voltage is maintained above normal crest value by restricting the cross-sectional area of the arc periodically in the small holes 37 in the ceramic washers 34, through which it passes. This voltage is maintained until the arc is forced to zero, where it is interrupted. The heat wells 40 do not enter into the operation at high currents. The area of the copper heat wells 40 exposed to the arc is a minimum, in order to reduce the quantity of copper vapor that is evolved.

On low currents between 4,000 and 10,000 amperes, the wire 38 melts in one or more notches 39. The current increases in the other wires, which progressively melt until the last few wires to melt are carrying sufficient current to make them current limiting. In this particular design, I have provided individual heat wells 40 for each wire 38, which is to be contrasted with the common heat wells provided in the fuse device of the Fahnoe Patent 2,605,371.

From the foregoing description, it will be apparent that I have provided a completely inorganic 400 ampere, 5 kv. fuse, which will interrupt over the entire range of current from minimum melting to 60,000 amperes, and is particularly suitable for application in explosive and corrosive atmospheres.

Also, it will be apparent that I have provided an improved, sturdy, simplified, and low cost mounting construction, which provides excellent current-carrying surfaces with the fuse clips 22, 23 and brings about an equal division of current through the two fuse tubes 9.

Although I have shown and described a particular fuse application for corrosive or explosive atmospheres in which venting is not desirable, and have hence utilized non-gas-evolving or ceramic insulating parts, it is to be clearly understood that for other applications, not involving corrosive or explosive atmospheres, other insulating materials, even gas-evolving materials, may readily be employed, where venting of the fuse is permissible.

Although I have shown and described a specific structure, it is to be clearly understood that the same was merely for the purpose of illustration, and that changes and modifications may readily be made therein by those skilled in the art, without departing from the spirit and scope of the invention.

I claim as my invention:

1. A fuse including one or more insulating pocketed discs having a plurality of spaced perforations adjacent the outer periphery thereof, heat-absorbing slugs disposed in the pockets of each insulating pocketed disc, and a plurality of spaced fuse wires extending through the perforations.

2. A fuse including one or more insulating pocketed discs having a plurality of spaced perforations therethrough, a plurality of spaced fuse wires extending through the perforations, one or more heat-absorbing slugs disposed in one or more pockets, and each slug being individual to a single fuse wire.

3. The combination in a fuse of a plurality of electrically parallel fusible elements, a plurality of spaced heat-absorbing slugs, each slug being associated with only one fusible element, and each fusible element having associated therewith two or more spaced heat-absorbing slugs.

4. A fuse including a plurality of insulating pocketed discs, a plurality of electrically parallel fusible elements supported at least partially by the discs, a plurality of spaced heat-absorbing slugs disposed within the pockets of the discs, and each slug being associated with only one fusible element.

5. The combination in a fusible device of a plurality of contiguously disposed insulating discs, each disc having a plurality of holes disposed circumferentially thereabout and a plurality of pockets, a plurality of fuse wires threaded through the holes, and a plurality of heat-absorbing slugs disposed within the pockets, each slug associated with only one wire.

6. A fuse including a plurality of insulating discs each disc having a plurality of staggered pockets on the opposite faces thereof, a plurality of spaced fuse wires extending substantially perpendicularly to said insulating discs, and a plurality of heat-absorbing slugs disposed in the pockets of said discs.

7. A fuse including a plurality of insulating discs each disc having a plurality of staggered pockets on the opposite faces thereof, a plurality of spaced fuse wires extending substantially perpendicularly to said insulating discs, a plurality of heat-absorbing slugs disposed in the pockets of said discs, and each heat-absorbing slug being individual to a single fuse wire.

8. A fuse including one or more insulating pocketed discs, a plurality of heat-absorbing slugs disposed within the pockets of the discs, a plurality of spaced fuse wires extending substantially perpendicularly to said discs, each slug being secured to a fuse wire on a face of relatively slight area, and the great mass of the slug being disposed away from the particular fuse wire to minimize metallic emission during fuse rupture.

9. The combination in a fuse of a plurality of adjacently disposed pocketed discs, a plurality of heat-absorbing slugs disposed within the pockets of said discs and spaced apart, a plurality of electrically parallel fusible elements extending along said fuse and at least partially supported by said discs, and said heat-absorbing slugs making physical contact with said fusible elements to extract heat therefrom.

10. The combination in a fuse of an insulating support rod, a plurality of adjacently disposed pocketed discs threaded on said support rod, a plurality of heat-absorbing slugs disposed within the pockets of said discs and spaced apart, a plurality of electrically parallel fusible elements extending along said fuse and at least partially supported by said discs, and said heat-absorbing slugs making physical contact with said fusible elements to extract heat therefrom.

References Cited in the file of this patent

UNITED STATES PATENTS

| | | |
|---|---|---|
| 546,957 | Gartner | Sept. 24, 1895 |
| 1,270,272 | Downes et al. | June 25, 1918 |
| 1,919,453 | Sumpter | July 25, 1933 |
| 2,024,744 | Rawlins | Dec. 17, 1935 |
| 2,147,316 | Ramsey | Feb. 14, 1939 |
| 2,165,015 | Sohles | July 4, 1939 |
| 2,209,823 | Lohausen | July 30, 1940 |
| 2,259,142 | Schuck | Oct. 14, 1941 |
| 2,605,371 | Fahnoe | July 29, 1952 |
| 2,662,140 | Kozacka | Dec. 8, 1953 |
| 2,670,418 | Kozacka | Feb. 23, 1954 |
| 2,688,061 | Kozacka | Aug. 31, 1954 |
| 2,713,098 | Swain | July 12, 1955 |

FOREIGN PATENTS

| | | |
|---|---|---|
| 28,872 | Great Britain | Dec. 21, 1911 |
| 29,122 | Great Britain | Dec. 15, 1910 |
| 673,432 | Germany | Mar. 22, 1939 |